(12) United States Patent
Cocchi et al.

(10) Patent No.: US 9,684,906 B2
(45) Date of Patent: Jun. 20, 2017

(54) FOOTAGE REPORTING (75) Inventors: Michael A. Cocchi, Wallingford, CT (US); Kishore B. Yarlagadda, East Haven, CT (US); Kevin D. Greelish, Coventry, CT (US); Joshua N. Cohen, Hartsdale, NY (US); Luke N. Macomber, Milford, CT (US); Chyloe F. Lucca, Unionville, CT (US); Jesse B. Pringle, Southington, CT (US); Marc W. Rowley, Westport, CT (US); Oyvind Gjorven, Canton, CT (US); Jason A. Nophsker, Durham, CT (US); Joseph A. Sack, Plantsville, CT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 1875 days.

(21) Appl. No.: 12/498,444

(22) Filed: Jul. 7, 2009

(65) Prior Publication Data
US 2011/0008018 A1 Jan. 13, 2011

(51) Int. Cl.
*G06F 21/00* (2013.01)
*G06Q 30/02* (2012.01)
*G06Q 50/18* (2012.01)
(52) U.S. Cl.
CPC ........... *G06Q 30/02* (2013.01); *G06Q 50/184* (2013.01)

(58) Field of Classification Search
None
See application file for complete search history.

(56) References Cited

U.S. PATENT DOCUMENTS

| 5,631,847 | A | * | 5/1997 | Kikinis | 709/207 |
| 6,034,731 | A | * | 3/2000 | Hurst, Jr. | 375/240.26 |
| 6,721,746 | B2 | * | 4/2004 | Zulpa et al. | |
| 7,694,212 | B2 | * | 4/2010 | Fikes et al. | 715/200 |
| 8,073,828 | B2 | * | 12/2011 | Bowden et al. | 707/705 |
| 2009/0094159 | A1 | * | 4/2009 | Cunningham et al. | 705/51 |

* cited by examiner

*Primary Examiner* — Paul R Fisher
(74) *Attorney, Agent, or Firm* — Fay Kaplun & Marcin, LLP (57) ABSTRACT

Footage used in an aired show by a broadcaster, broadcasting network or similar entity can be more easily tracked and reported to rights holders. An electronic cutsheet can be created for a video package. The electronic cutsheet includes information identifying one or more footage items included in the video package and any rights holders associated with the footage item. Using the cutsheets, a number of playlists can be created or otherwise provided. Each playlist is associated with at least one video package. The playlist can then be associated with a show to indicate that the show has aired and thus that the playlist and its included packages have actually been used. A report can then be generated that indicates at least one rights holder and the number of instances in which a footage item associated with the indicated rights holder was included in an aired show.

23 Claims, 6 Drawing Sheets

FOOTAGE REPORTING

BACKGROUND

Broadcast television shows that feature news or other reports commonly include pre-recorded footage in which a party other than the broadcaster owns rights. (Although the term "footage" has origins in film, in the lexicon of modern broadcasting the term "footage" refers to recorded content without regard to whether it may be recorded on film, videotape, optical disk, solid-state memory, or other physical medium.) Typically, in accordance with a contractual agreement between the rights holder and the broadcaster, the broadcaster is required to provide monetary compensation to the rights holder for the use the footage in the show. For example, a professional sports organization may own rights to footage filmed of the organization's games. Accordingly, a television news or sports broadcaster, reporting on the results of a game or a related topic as part of a news or sports show, may be required to pay compensation to the sports organization for each instance in which a portion of a game is shown in a broadcast (show). The amount of the compensation is dictated by the contractual arrangement. The compensation may be based on a formula. In some instances, the formula can take into account the time interval between the time the footage was recorded and the time the show is aired (i.e., broadcast). For example, a rights holder may charge less for footage aired on a show within a few hours of a game having been played than the rights holder charges for the same footage aired on a show weeks or months later, as the former may be categorized as use of "news" footage while the latter instance may be categorized as use of "archival" footage. For this reason, broadcasters have long kept elaborate logs that associate each item of footage used in a broadcast with the corresponding rights holder, the date the footage was used, the context in which it was used, etc. At the end of a time period, e.g., monthly, quarterly, etc., the broadcaster reviews the logs and, for each rights holder, tallies the number of instances in which footage owned by that rights holder was used, and otherwise computes the amount of monetary compensation due to the rights holders in accordance with the contractually applicable rules.

During the process of producing shows, a large number of segments or "packages" are commonly created. A package is recorded content, i.e., video (which can include an audio track), that is intended to be used as a segment of a show. A show comprises a number of packages appended to one another.

A producer can review the packages that production assistants or others have created and select those that the producer would like to include in the show. This process may be aided by "cutsheets" that have been created for the packages. A cutsheet is a description of a package that lists, in time-sequential order, the elements that are included in the package, including footage, transitional elements, graphics, animations, effects, audio format, and running time. A cutsheet may have a timeline-like appearance, showing at what timepoints (relative to a timecode) in the package each element begins and ends.

A computer-based system that automates the process of creating cutsheets has been used. An "electronic cutsheet" generated by such a system can readily be shared among system users via a computer network. During production of a show, various members of the production team can access the cutsheets.

Once a producer has compiled a sequence of packages to be included in a show, a "playlist" (also referred to as a "rundown" or "running order") can be created. The playlist lists, in time-sequential order, the packages that are included in the show, along with other pertinent information.

A computer-based or electronic broadcast newsroom control system (NCS) has been used to automate some of the above-described processes of creating packages, cutsheets, and show playlists. One of the most commonly used broadcast newsroom control systems is the Electronic News Production System (ENPS), available from The Associated Press. In ENPS, the rundown defines the basic organization of a news broadcast. In ENPS, a rundown can include packages (i.e., video, which can include an audio track), scripts, device control, production information, and other information. The term "device control" refers to the capability of the system to electronically interface with devices such as video and still-image servers, teleprompters, character generators, etc., through the Media Object Server (MOS) protocol. Newsroom personnel, such as writers, producers, directors, and on-air talent, can access ENPS through a suite of software applications running on client workstations.

Although a large number of packages are typically created during the process of producing shows, only a small percentage of the created packages are actually included in a show and aired. As broadcasters are only required to compute compensation for footage that is actually aired, broadcasters find it cumbersome and difficult to log and otherwise keep track of footage use where not all of the footage may need to be reported to rights holders. It would therefore be desirable to provide a system and method that facilitates footage reporting.

SUMMARY

Embodiments of the present invention relate to a system and method for facilitating reporting footage used in an aired show by a broadcaster, broadcasting network or a similar entity. In an exemplary embodiment, a number of video packages are first created by or otherwise provided for use by the broadcasting entity. Each video package includes at least one footage item in which a rights holder other than the broadcasting entity has rights that entitle the rights holder to compensation for use of the footage item in an aired show. An electronic cutsheet is then created or otherwise generated for each video package. The electronic cutsheet includes information identifying one or more footage items included in the video package and any rights holders associated with the footage item. Then, using the cutsheets, a number of playlists are created or otherwise provided. That is, each playlist is associated with at least one video package. The playlist can then be associated with a show to indicate that the show has aired and thus that the playlist and its included packages have actually been used. A report or other data file can then be generated that indicates at least one rights holder and the number of instances in which a footage item associated with the indicated rights holder was included in an aired show. The report or other data file can be used to compute compensation to the rights holder for the use of the footage.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The invention can be better understood with reference to the following figures. The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
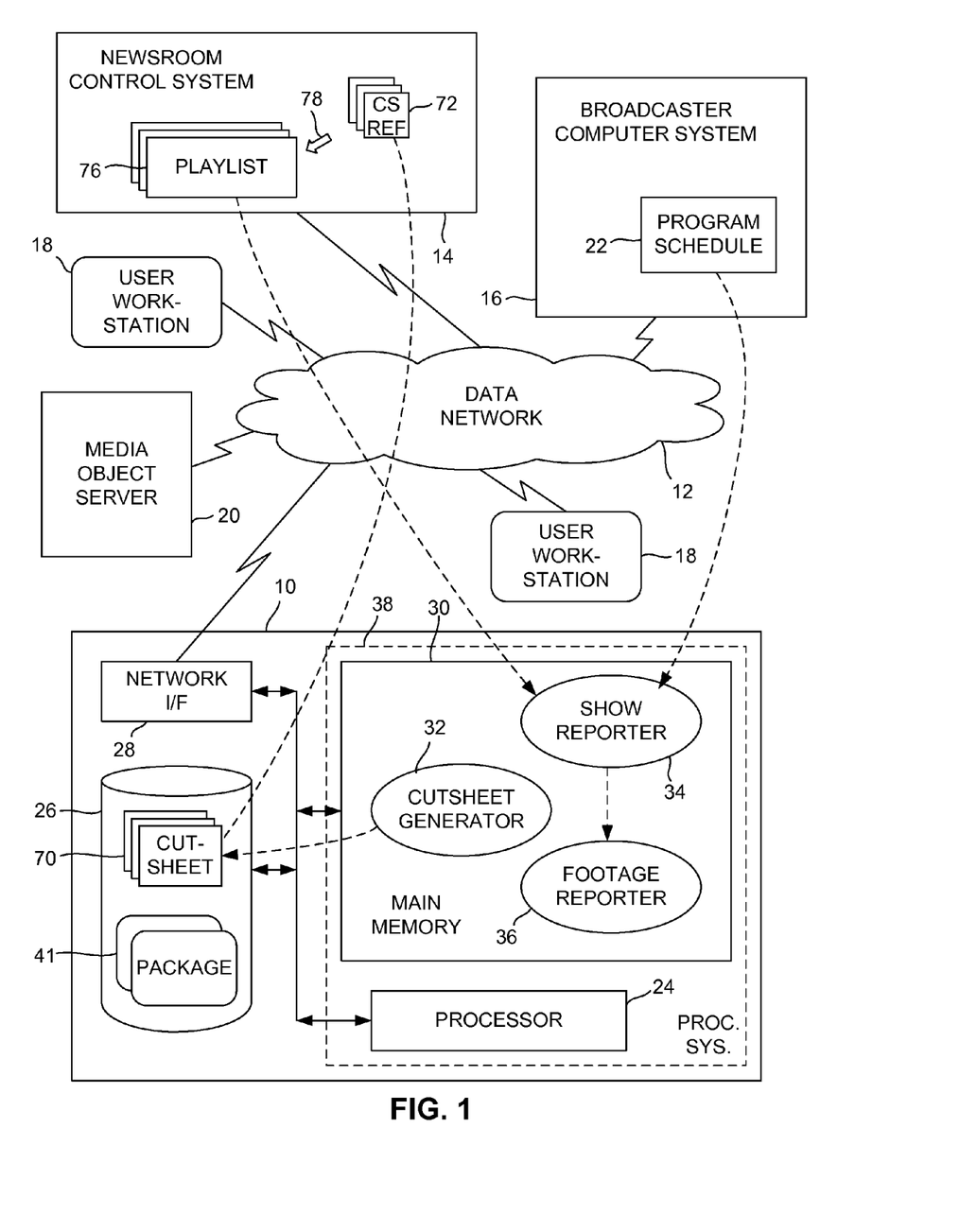
FIG. 1 is a block diagram of a system for producing television shows and reporting footage used therein, in accordance with an exemplary embodiment of the invention.

As illustrated in FIG. 1, in an illustrative or exemplary embodiment of the invention, a system for generating electronic cutsheets and reporting footage is based upon a server computer 10 that communicates via a data network 12 with a newsroom control system (NCS) 14, a broadcaster computer system 16, and various user workstations 18. In the exemplary embodiment, these elements are used in connection with producing and airing the type of product that is commonly referred to as a television show or simply "show." As described below in further detail, the type of show to which the invention relates includes footage in which another party (i.e., other than the broadcaster) owns rights. The other party may be referred to as a "rights holder." It should be understood that although the term "broadcaster" or "broadcasting entity" is used in this patent specification ("herein") for purposes convenience, the entity can distribute the shows in any suitable manner, including via data networks, whether land-line, satellite, terrestrial radio, or other type. Similarly, it should be understood that the terms "television," "show," and to "broadcast" (or "air") are used for purposes of convenience, and the terms are not intended to limit the format of the content or the medium through which it is processed or distributed.

NCS 14 can be, for example, the Electronic News Production System (ENPS), which is available from The Associated Press, or any other suitable type of NCS. Although not separately shown for purposes of clarity, NCS 14 comprises software that operates on one or more server computers, and through which users, such as users of client workstations 18, can produce and manage news and similar shows. (ENPS, for example, operates in accordance with conventional client-server computing principles.) NCS 14 can access one or more media object servers 20, on which are stored various types of information useful for producing shows, via data network 12. As the manner in which NCS 14 is used to produce shows is well understood in the art, the processes are not described herein except to the extent relevant to the present invention.

It should be understood that "newsroom control system" 14 is referred to by that name herein not because its use is limited to controlling production of "news" shows but rather because "newsroom control system" is a well-understood generic term in the art for such a system (of which ENPS is a specific example). NCS 14 can be used to control production of any suitable type of show.

Broadcaster computer system 16 represents a computer system (e.g., one or more server computers and associated computer system elements) that a spectrum of personnel of the broadcasting entity can access to perform various tasks relating to the operation of the entity, including such diverse tasks as maintaining a program schedule 22 (i.e., a schedule of when shows air), coordinating advertising sales, performing accounting procedures, etc.

Although server computer 10, NCS 14, and broadcaster computer system 16 are shown in FIG. 1 as separate elements for purposes of illustration in the exemplary embodiment, other embodiments (not shown) can include other elements that combine their various functions. For example, in some embodiments a single server computer or network of server computers can include the functions attributed below to server computer 10, NCS 14, and broadcaster computer system 16. Conversely, in other embodiments (not shown) the functions attributed below to server computer 10, NCS 14, and broadcaster computer system 16 can be distributed over a larger number of server computers, networks or other elements. Furthermore, such elements can be disposed in any suitable location and are not limited to locations within a single building, campus, or other premises occupied by the broadcasting entity. Although data network 12 is shown in FIG. 1 as a single network for purposes of illustration, in other embodiments the elements described herein or other elements can be interconnected via any suitable arrangement of networks.

Server computer 10 can comprise any suitable elements of the types commonly included in server computers or similar computing systems. For example, server computer 10 can include one or more processors 24, data storage devices 26, network interfaces 28, and memory devices 30. The one or more memory devices 30 are generally of a type in which software elements, such as data and programming code, are operated upon by processor 24. In accordance with conventional computing principles, processor 24 operates under the control of programming code, such as operating system code and application program code (not shown for purposes of clarity). Such programming code, i.e., software elements, includes a cutsheet generator 32, a show reporter 34, and a footage reporter 36, which are described below in further detail. Although these software elements are shown for purposes of illustration as stored or residing in memory devices 30, it is understood that such software elements may not reside simultaneously or in their entireties in memory devices 30 but rather may be retrieved in portions on an as-needed basis, e.g., in code segments, files, instruction-by-instruction, or any other suitable basis, from data storage 26 or other suitable source (e.g., via data network 12). Note that although only cutsheet generator 32, show reporter 34, and footage reporter 36 are shown for purposes of clarity, other software of the types conventionally included in computers systems that enable them to operate properly is generally included, such as operating system software. Similarly, other hardware elements of the types conventionally included in computer systems can be included.

It should be noted that, as programmed with the above-described software elements, the combination of processor 24, memory devices 30 (or other element or elements in which software elements are stored or reside) and any related elements generally defines a programmed processor system 38. It should also be noted that the combination of software elements and the medium on which they are stored or in which they reside (e.g., memory devices 30, data storage 26, media server 20, one or more removable or portable disks (not shown), etc.) generally constitutes what is referred to in the patent lexicon as a "computer program product."

Figure 2:
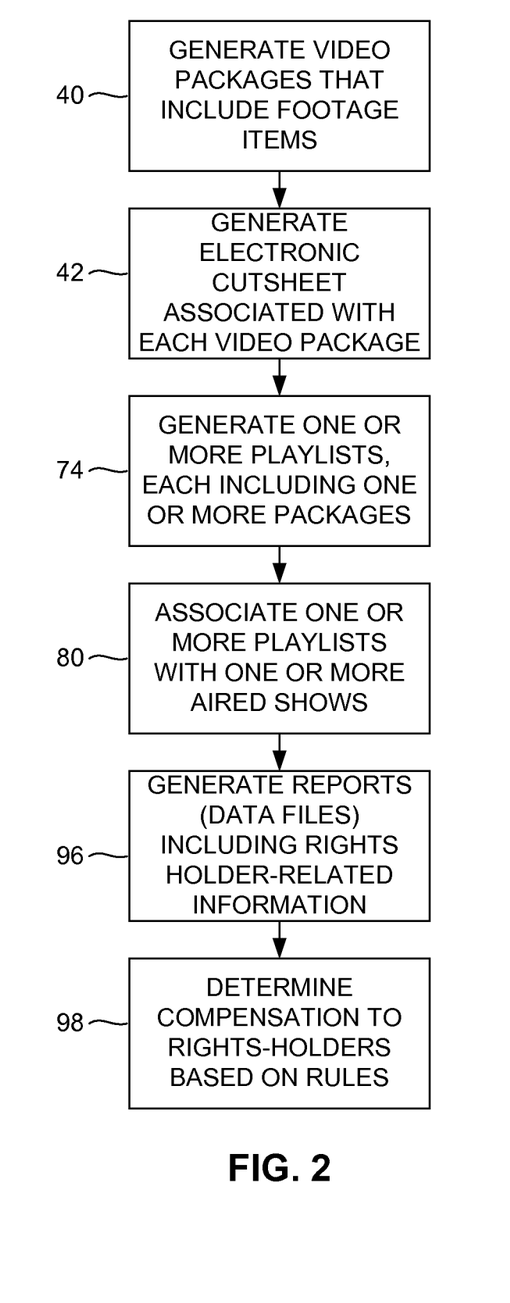
FIG. 2 is a flow diagram illustrating an exemplary method for reporting footage used in a show, in accordance with the exemplary embodiment of the invention.

As illustrated by the flow diagram of FIG. 2, the system described above with regard to FIG. 1 can be used to report footage used in a show. As indicated by block 40, a user, such as a person operating one of client workstations 18, first generates or otherwise provides one or more video packages 41 that include one or more footage items. The person can do this in the conventional manner by compiling a sequence of video elements that can include footage items, graphics, effects, animations, etc. As the production of video packages 41 is not directly relevant to the present invention, and may be performed using equipment separate from the elements shown in FIG. 1, such video production is not described or illustrated in further detail herein. It is sufficient for purposes of the exemplary embodiment described herein to note that a package 41 comprises elements that can include footage items in which third parties own rights. It should also be noted that, as each video element in a video package 41 has a length or runtime, each video package 41 as a whole has a total runtime that is the sum of the lengths of its elements. Video packages 41 can be stored in data storage 26 associated with server computer 10 or other suitable location.

A footage item can include any suitable content. For example, a footage item can be a video clip, i.e., segment of video having a predetermined runtime, of a sports event or news event. Broadcasters commonly obtain footage from third-party sources that filmed the event, such as local television stations or other broadcasters. Under a contractual agreement between the broadcaster and the third-party source or owner of the footage, the broadcaster may be obligated to pay monetary compensation to the source or owner if the broadcaster uses the footage as part of a show that the broadcaster airs. Such contractual agreements can include various rules that dictate the amount of compensation based upon the number of times a footage item is aired within a desired or predetermined time interval or based upon other such rules. For example, each month or quarter a broadcaster may be required to compute the total number of times that footage to which a certain rights holder has rights was aired, and pay that rights holder an amount equal to that number multiplied by a specified fee. Other factors may be included in the computation. For example, the contract may include a rule specifying a first fee for footage aired within a predetermined time interval after the event was filmed and a second fee for footage aired after that time interval. It is common for rights holders to consider footage aired within a few days or weeks following an event to be "news footage," for which a first fee is charged, and consider footage aired at a later time to be "archival footage," for which a different fee is charged. As described below, in the exemplary embodiment the system tracks the above-described time interval to aid in computing the appropriate fee. The time interval is only an example of one factor that can be tracked, as the time interval is a commonly used factor in contractual compensation rules.

As indicated by block 42, a user, using one of client workstations 18, can generate an electronic cutsheet for a video package. The process represented by block 42 is effected by the operation of processing system 38 operating primarily under the control of cutsheet generator 32 (FIG. 1). The user can access NCS 14 to view packages. In an embodiment in which the broadcaster produces various shows, packages may be organized in NCS 14 by show, e.g., accessible to users via a graphical user interface in which folders (not shown) represent shows, and each folder can contain one or more packages and other items associated with that show. In generating an electronic cutsheet, the user can select a show with which the electronic cutsheet is to be associated.

Figure 3:
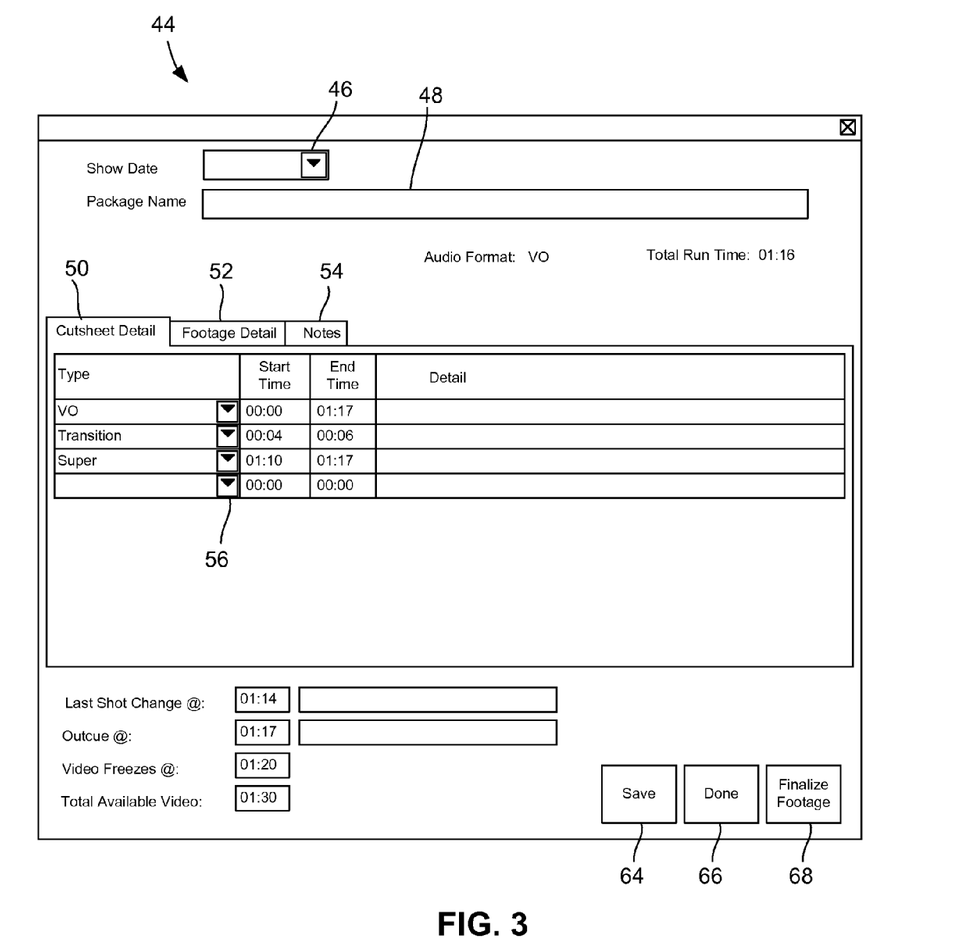
FIG. 3 illustrates a user interface screen display in a system for producing electronic cutsheets and reporting footage in accordance with the exemplary embodiment of the invention.

An exemplary screen display 44 representing an electronic cutsheet 70 (FIG. 1) is shown in FIG. 3. The user can provide input via screen display 44 and its constituent graphical user interface elements to enter information into the electronic cutsheet. For example, the user can use a drop-down selector 46 to select a Show Date, i.e., the date on which the show is anticipated to air. The user can enter a Package Name into a text box 48. Other graphical elements in the illustrated embodiment include three tabs: Cutsheet Detail tab 50, Footage Detail tab 52, and Notes tab 54. By selecting Cutsheet Detail tab 50, the user can enter each element of the package. Three exemplary elements are shown in FIG. 3 as having been entered: a Voiceover ("VO"), a "Transition," and a superimposed graphics ("Super"). A user can activate (i.e., click on) drop-down selectors 56 to select such elements from among a menu (not shown) of elements. The user can enter a Start Time to indicate the timepoint in the sequence (with respect to the total run time) at which the element begins, and an End Time to indicate the timepoint in the sequence at which the element ends. For example, in the exemplary screen display 44 the Voiceover element starts at 00:00 and ends at 01:17. Corresponding "Detail" text boxes are provided for the user to enter a description of each element. It should be noted that in this example the Voiceover element is footage, which may be indicated by displaying the corresponding text or text box in a distinguishing color, to distinguish the voiceover element from elements of the package that are not footage, such as the transition and the superimposed graphics.

Figure 4:
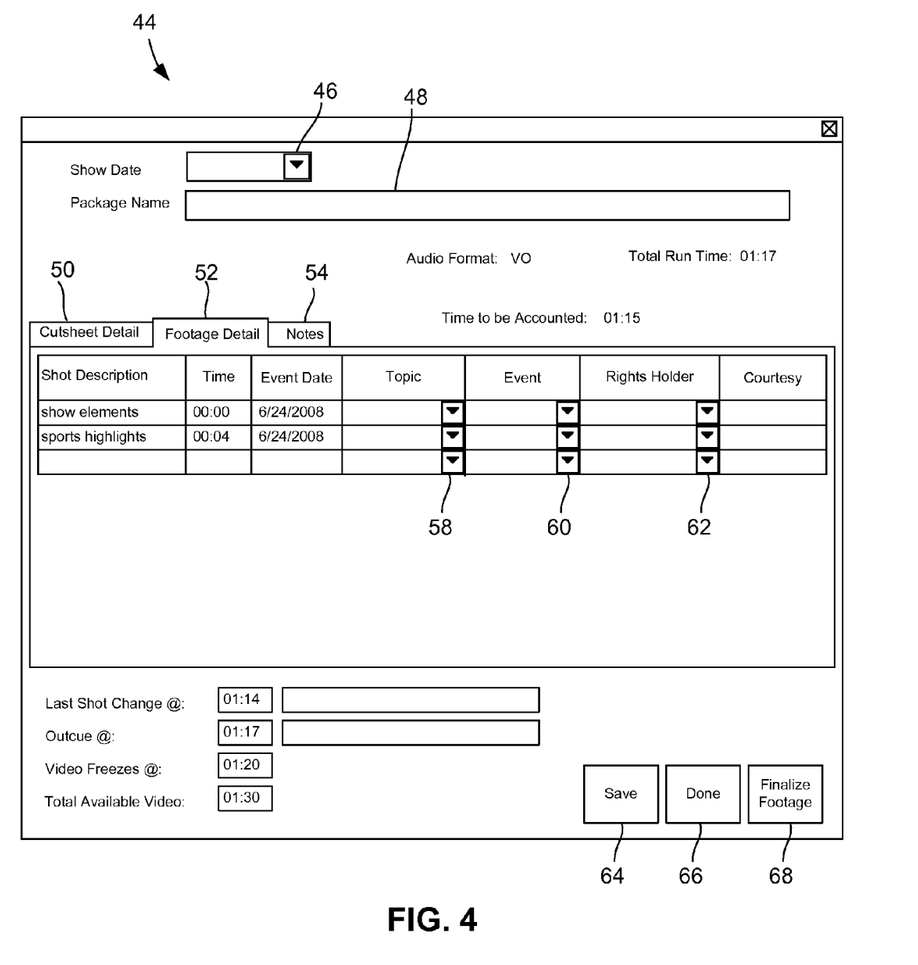
FIG. 4 is similar to FIG. 2 and illustrates another form of the user interface screen display.

If the user selects Footage Detail tab 52, the appearance of screen display 44 changes to that which is shown in FIG. 4. Text boxes are provided for the user to enter Shot Descriptions describing the various footage items and the timepoint in the sequence (with respect to the total run time) at which the footage begins. The user can also enter an Event Date to indicate the date on which the footage was filmed. The Event Date is used in a later step, described below, to determine the time interval between the event and the airing of footage of the event, so that compensation can be computed in accordance with any rules that take the interval into account.

Three additional drop-down selectors 58, 60 and 62 are provided for each footage item that allow a user to select a Topic, Event and Rights Holder, respectively. When the user clicks on drop-down selector 58, the user is presented with a menu of possible topics from which the user can choose to associate with the corresponding footage item. Topics can include, for example, various sports such as "Baseball" or "Football," or other subject matter of which footage is commonly filmed. When the user clicks on drop-down selector 60, the user is presented with a menu of possible events from which the user can choose to associate with the corresponding footage item. Events can include, for example, sporting events such as "Division Championship," or news events such as "Political Party Convention." When the user clicks on drop-down selector 62, the user is presented with a menu of possible rights holders from which the user can choose to associate with the corresponding footage item. In accordance with one aspect of the exemplary embodiment, rules can be pre-defined that filter or limit the Rights Holder menu items that are presented, depending upon the selected topic, event, or combination of selected topic and event. For example, a rule may specify that all footage associated with a certain event is also associated with a certain rights holder. Similarly, for example, a rule may specify that all footage associated with a certain topic is associated with one of a certain set of rights holders. Filtering the set of all possible rights holders in response to a rule and the selected topic, event, or combination thereof, facilitates the user's task of selecting the correct rights holder. A text box is also provided in which a user can enter "Courtesy" information that identifies any non-rights-holding entity that may have provided the footage.

At any time while entering cutsheet information via screen display 44, the user can click on a Save button 64 to save the entered information (e.g., in data storage 26 (FIG. 1)). When the user is finished entering information, the user can click on a Done button 66, which causes the information to be checked to determine whether it is valid, i.e., whether it meets predetermined criteria. For example, the information may be checked to ensure that the sum of the lengths of the elements, as entered by the user, conforms to the total runtime of the package. If no errors are detected, the electronic cutsheet is marked as being ready for use in production of shows. Specifically, a message is transmitted from server computer 10 to NCS 14. The message can conform to the Media Object Server (MOS) protocol that ENPS uses. With further reference to FIG. 1, electronic cutsheet 70 can be stored or saved in data storage 26. NCS 14 responds to the message by storing a cutsheet reference 72 (i.e., a marker or pointer that references cutsheet 70) in a suitable location in NCS 14 or otherwise accessible to NCS 14. Media object server 20 can act as an interface between server computer 10 and NCS 14 by translating cutsheet reference 72 from a native format used by server computer 10 to the MOS protocol.

Returning to FIG. 2, as indicated by block 74 a user, using one of client workstations 18, can generate playlists 76 (FIG. 1) for a show. The user can perform this process in any suitable manner, such a manner similar to that in which playlists are generated using ENPS in the conventional manner. As ENPS and similar network control systems are well understood in the art, the manner in which a NCS such as ENPS is used to generate playlists and its user interface are not described herein. However, in accordance with the exemplary embodiment of the invention, NCS 14 (FIG. 1) further provides the user with a list of the above-described cutsheet references 72. For example, the list can be displayed within a window of a suitable screen display (not shown for purposes of clarity). A user can add such a cutsheet reference 72 to a playlist 76 in any suitable manner, such as a manner that generally conforms to the manner in which other elements are conventionally added to playlists using an NCS such as ENPS. For example, as conceptually indicated by the arrow 78 in FIG. 1, a user can graphically drag one of cutsheet references 72 into a graphical structure (not shown) representing a playlist 76. In this manner, the user can logically link the playlist 76 to one or more cutsheets 70, which represent the packages to be included in the show. Note that the linking can occur via media object server 20, which act as an intermediary or interface by translating between the native information format of server computer 10 and the MOS protocol of NCS 14. Thus, any user, such as another member of the production team, can access a cutsheet 70 using NCS 14. The process of providing cutsheet references 72 to NCS 14 is effected by the operation of processing system 38 operating primarily under the control of show reporter 34. A feature can be included to allow a user to access and view the original footage in this manner. Using electronic cutsheets 70 in the manner described above facilitates overall production of the show.

Figure 5:
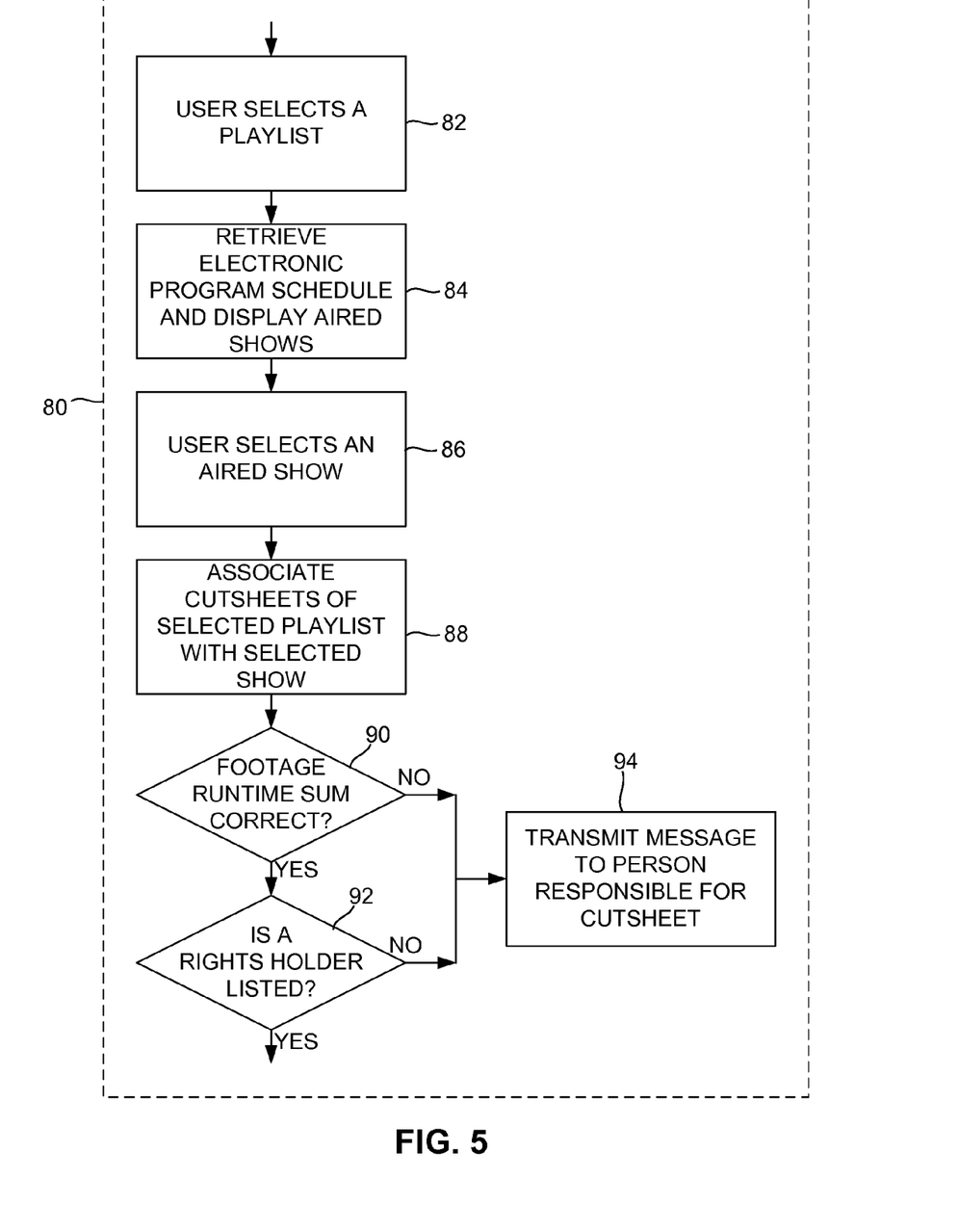
FIG. 5 is flow diagram illustrating portions of the flow diagram of FIG. 2 in further detail.

As indicated by block 80 in FIG. 2, once the show has been produced, a user such as the producer of the show, using one of client workstations 18, can cause a playlist 76 to be associated with an aired show. Note that although playlists 76 that have been generated correspond to the broadcaster's shows (and may be stored, for example, in folders in NCS 14 labeled with the names of the various shows), the playlists are commonly created or generated before a show actually airs. To facilitate tracking only footage that was actually used, i.e., aired, a user or other mechanism associates one of playlists 76 with an aired show, as indicated by block 80. This process, too, is effected primarily under the control of show reporter 34 (FIG. 1). In the exemplary embodiment, to determine which shows have aired, show reporter 34 accesses program schedule 22 in broadcaster computer system 16. Show reporter 34 can likewise access playlists 76 in NCS 14. Block 80 can include the sub-blocks (blocks 82, 84, 86, 88, 90, 92 and 94) shown in FIG. 5. With reference to FIG. 5, the user can select one of playlists 76, as indicated by block 82. Media object server 20 can act as an interface between server computer 10 and NCS 14 by translating the selected playlist 76 from the MOS protocol used by NCS 14 to the native format used by server computer 10. A list of aired shows, e.g., the name of each show and the data and time it aired, can be retrieved by accessing program schedule 22 (FIG. 1) and displayed for the user, as indicated by block 84. From the list, the user can select a show, e.g., by clicking on the name, as indicated by block 86. In response to these selections, the selected aired show is associated with the selected playlists 76.

Validation or checking can be performed upon the selected playlist 76. As indicated by block 90, if the sum of the runtimes of footage associated with the selected playlist 76 (as indicated in any cutsheet 70 (FIG. 1) referenced in the selected playlist 76) does not equal the total runtime indicated in that cutsheet 70, an error indication is generated. Although any suitable action can be taken in response to the error indication, in the exemplary embodiment an electronic message (e.g., e-mail) is transmitted to the messaging account (e.g., e-mail mailbox) of the person or persons responsible for the cutsheet's content, as indicated by block 94. The person, such as a production assistant, can then access the cutsheet and correct the erroneous information. Also, as indicated by block 92, if any footage referenced in the cutsheet does not include information identifying a rights holder, an error indication can be generated. Although any suitable action can be taken in response to the error indication, in the exemplary embodiment an electronic message (e.g., e-mail) is likewise transmitted to the messaging account (e.g., e-mail mailbox) of the person or persons responsible for the cutsheet's, as also indicated by block 94. The person can then access that cutsheet 70 and add the name of any omitted rights holder. Once such information has been entered in that cutsheet 70, clicking on a "Finalize Footage" button 68 (FIG. 3) marks that cutsheet 70 as suitable for inclusion in the reporting process described below.

Referring again to FIG. 2, as indicated by block 96, server computer 10 can generate data files, which can be in the form of human-readable reports, files exportable to spreadsheet programs, or any other suitable form. The process indicated by block 96 is effected primarily under the control of footage reporter 36 (FIG. 1). The user can request that a data file be generated based on any suitable criteria or formatting requirements. For example, the user can request that a data file be generated listing all footage used, i.e., aired, between a first user-specified date and/or time and a second user-specified date and/or time. The user can request that a data file list all footage to which a user-specified rights holder has rights. The user can limit the data file to a single specified rights holder, all rights holders, or a specified group of rights holders. The data file can include an indication of the rights holder or rights holders and footage in any suitable manner or format. The data file indicates the number of instances in which footage items associated with an indicated rights holder were included in an aired show. The report can break down the footage usage on a per-use basis, listing the name of each footage item used, or indicate only totals, sub-totals, etc.

As indicated by block 98, once a data file that associates aired footage items with rights holders has been generated, compensation to the rights holders can be computed. As known in the art, compensation is computed in response to rules, some or all of which may be specified in a contract involving the broadcaster and rights holder and/or owner. A rule can be associated with all rights holders, a subset of rights holders, or apply uniquely to only a single rights holder.

The Topic and Event information described above with regard to the exemplary electronic cutsheet 70 can be used as inputs to the applicable compensation rules. For example, a rule can specify that compensation is to be computed differently depending on the Event to which the footage relates. A rights holder may charge more, for example, for footage relating to a championship sports match than for footage relating to other matches.

Figure 6:
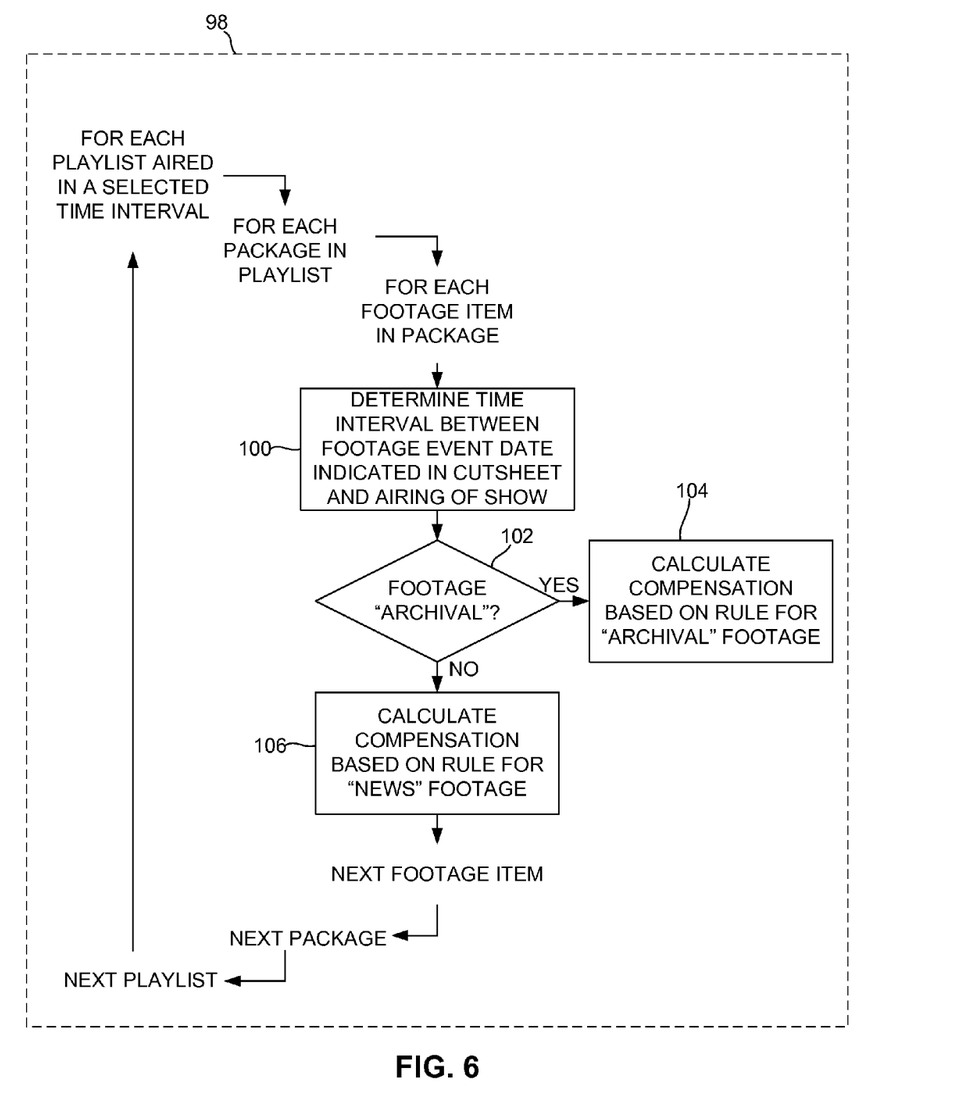
FIG. 6 is flow diagram illustrating other portions of the flow diagram of FIG. 2 in further detail.

The use of the Event Date described above with regard to the exemplary electronic cutsheet 70 as an input to the applicable compensation rules is shown in further detail in FIG. 6. This example represents an instance in which a rights holder distinguishes between "news footage" and "archival footage" or otherwise charges a different rate depending on age of the footage or time elapsed since the footage was filmed.

For each playlist 76 aired within the user-selected time interval, compensation is computed for the footage referenced in that playlist 76. More specifically, for each cutsheet 70 referenced in that playlist 76, compensation is computed for the footage referenced in that cutsheet 70. (Note that a cutsheet 70 references footage included in a package that was aired as part of a show.) Still more specifically, for each footage item referenced in that cutsheet 70, the time interval between the date the footage item was filmed (i.e., the Event Date indicated in cutsheet 70) and the date the show was aired is determined, as indicated by step 100. If, as indicated by step 102, the time interval is greater than a predetermined amount, the footage is considered "archival footage." If the time interval is not greater than the predetermined amount, the footage is considered "news footage." Compensation for archival footage can then be computed in the conventional manner on the basis of the predetermined fee associated with archival footage, as indicated by step 104. Compensation for news footage can be computed in the conventional manner on the basis of the predetermined fee associated with news footage, as indicated by step 106. It should be noted that the computation based upon the age of the aired footage represents only one example of how information contained within an electronic cutsheet 70 can be used as an aid to computing compensation and that various others will occur readily to persons skilled in the art to which the invention relates in view of the teachings and examples herein.

While one or more embodiments of the invention have been described as illustrative of or examples of the invention, it will be apparent to those of ordinary skill in the art that other embodiments and implementations are possible that are within the scope of the invention. Accordingly, the scope of the invention is not to be limited by such embodiments but rather is determined by the appended claims.

What is claimed is:

1. A non-transitory computer-readable storage medium storing a set of instructions executable by a processor, the set of instructions, when executed by the processor, causing the processor to perform operations comprising:
   receiving a plurality of video packages, each video package including at least two footage items;
   generating an electronic cutsheet associated with a video package, the electronic cutsheet including information identifying a chronological order of the at least two footage items included in the video package, information identifying a rights holder associated with the at least two footage items, and information identifying details on a recorded event that is associated with the at least two footage items, wherein the event comprises a planned structured activity;
   generating a plurality of playlists, wherein the playlists are based on the generated electronic cutsheet, and further wherein each playlist is associated with one of the video packages by creating a pointer from each playlist to the electronic cutsheet associated with the one of the video packages;
   determining an association of each playlist with an aired show, wherein the determining the association of each playlist with the aired show includes checking for footage errors in each cutsheet associated with the aired show, wherein checking for footage errors includes determining whether a sum of runtimes of all footage items associated with a cutsheet equals a total runtime of the cutsheet;
   determining a number of instances in which a footage item was included in an aired show based on references made by an associated playlist to the electronic cutsheet via the pointer; and
   generating a data file indicating at least one rights holder of the footage item and the number of reported instances in which a footage item associated with the indicated rights holder was included in the aired show.

2. The non-transitory computer-readable storage medium claimed in claim 1, wherein generating a data file comprises generating one data file for each rights holder.

3. The non-transitory computer-readable storage medium claimed in claim 2, further comprising determining compensation to each rights holder in response to the number of instances in which a footage item associated with the indicated rights holder was included in an aired show.

4. The non-transitory computer-readable storage medium claimed in claim 1, wherein compensation is further determined in response to the event date of each footage item and a date of the aired show in which the footage item was included.

5. The non-transitory computer-readable storage medium claimed in claim 1, wherein determining the association of each playlist with an aired show further includes electronically transmitting a message via a data network to a messaging account of a person responsible for a cutsheet in which a sum of runtimes of all footage items associated with the cutsheet does not equal the total runtime of the cutsheet.

6. The non-transitory computer-readable storage medium claimed in claim 1, wherein the determining the association of each playlist with an aired show includes checking for footage errors in each cutsheet associated with the aired show, wherein checking for footage errors includes determining whether each footage item associated with a cutsheet includes the information identifying a rights holder associated with the footage item.

7. The non-transitory computer-readable storage medium claimed in claim 6, wherein the determining the association of each playlist with an aired show further includes electronically transmitting a message via a data network to a messaging account of a person responsible for a cutsheet in which a footage item does not include the information identifying a rights holder associated with the footage item.

8. The non-transitory computer-readable storage medium claimed in claim 1, wherein the determining the association of each playlist with an aired show comprises:
retrieving an electronic program schedule listing a plurality of shows;
receiving user input indicating a show selected from among the plurality of shows; and
storing an electronic indication of a determined association between the playlist and the selected show.

9. The non-transitory computer-readable storage medium claimed in claim 1, wherein generating an electronic cutsheet comprises:
receiving user input indicating a topic selected from among a plurality of candidate topics;
applying a predetermined rule to at least the selected topic; and
determining at least one candidate rights holder from among a plurality of candidate rights holders in response to the selected topic and the predetermined rule.

10. The non-transitory computer-readable storage medium claimed in claim 1, wherein generating an electronic cutsheet comprises:
receiving user input indicating an event selected from among a plurality of candidate events;
applying a predetermined rule to at least the selected event; and
determining at least one candidate rights holder from among a plurality of candidate rights holders in response to the selected event and the predetermined rule.

11. The non-transitory computer-readable storage medium claimed in claim 1, wherein generating an electronic cutsheet further comprises transmitting an electronic cutsheet reference to a newsroom control system, the cutsheet reference referencing an electronic cutsheet stored remotely from the newsroom control system.

12. A system for reporting footage used in a show produced using a newsroom control system, comprising:
data storage for storing information relating to electronic cutsheets;
a network interface, the network interface providing data communication with the newsroom control system; and
a processor system, the processor system comprising memory and one or more processors programmed or configured to:
generate an electronic cutsheet associated with a video package, the electronic cutsheet including information identifying a chronological order of at least two footage items included in the video package, information identifying a rights holder associated with the at least two footage items, and information identifying details on a recorded event that is associated with the at least two footage items, wherein the event comprises a planned structured activity;
generate a playlist stored in the newsroom control system, wherein the playlists are based on the generated electronic cutsheet, and further wherein the playlist is associated with the video package by creating a pointer from each playlist to the electronic cutsheet associated with the video package;
determine an association of the playlist with an aired show, wherein the determining the association of the playlist with the aired show includes checking for footage errors in each cutsheet associated with the aired show, wherein checking for footage errors includes determining whether a sum of runtimes of all footage items associated with a cutsheet equals a total runtime of the cutsheet;
determine a number of instances in which a footage item was included in an aired show based on references made by the associated playlist to the electronic cutsheet via the pointer; and
generate a data file indicating at least one rights holder of the footage item and the number of reported instances in which a footage item associated with the indicated rights holder was included in the aired show.

13. The system claimed in claim 12, wherein the processor system is programmed or configured to generate a data file by generating one data file for each rights holder.

14. The system claimed in claim 13, wherein the processor system is further programmed or configured to determine compensation to each rights holder in response to the number of instances in which a footage item associated with the indicated rights holder was included in an aired show.

15. The system claimed in claim 12, wherein the processor system is programmed or configured to determine compensation by determining compensation in response to the event date of each footage item and a date of the aired show in which the footage item was included.

16. The system claimed in claim 12, wherein the processor system is programmed or configured to determine the association of each playlist with an aired show by electronically transmitting a message via a data network to a messaging account of a person responsible for a cutsheet in which a sum of runtimes of all footage items associated with the cutsheet does not equal the total runtime of the cutsheet.

17. The system claimed in claim 12, wherein the processor system is programmed or configured to associate each playlist with an aired show by checking for footage errors in each cutsheet associated with the aired show, wherein checking for footage errors includes determining whether each footage item associated with a cutsheet includes the information identifying a rights holder associated with the footage item.

18. The system claimed in claim 17, wherein the processor system is programmed or configured to associate each playlist with an aired show by electronically transmitting a message via a data network to a messaging account of a person responsible for a cutsheet in which a footage item does not include the information identifying a rights holder associated with the footage item.

19. The system claimed in claim 12, wherein the processor system is programmed or configured to determine the association of each playlist with an aired show by being programmed or configured to:
retrieve an electronic program schedule listing a plurality of shows;
receive user input indicating a show selected from among the plurality of shows; and
store an electronic indication of a determined association between the playlist and the selected show.

20. The system claimed in claim 12, wherein the processor system is programmed or configured to generate an electronic cutsheet by being programmed or configured to:
receive user input indicating a topic selected from among a plurality of candidate topics;
apply a predetermined rule to at least the selected topic; and
determine at least one candidate rights holder from among a plurality of candidate rights holders in response to the selected topic and the predetermined rule.

21. The system claimed in claim 12, wherein the processor system is programmed or configured to generate an electronic cutsheet by being programmed or configured to:
receive user input indicating an event selected from among a plurality of candidate events;
apply a predetermined rule to at least the selected event; and
determine at least one candidate rights holder from among a plurality of candidate rights holders in response to the selected event and the predetermined rule.

22. The system claimed in claim 12, wherein the processor system is programmed or configured to generate an electronic cutsheet by being further programmed or configured to transmit an electronic cutsheet reference to a newsroom control system, the cutsheet reference referencing an electronic cutsheet stored remotely from the newsroom control system.

23. A computer program product for determining footage used in a show produced using a newsroom control system, the computer program product comprising a non-transitory computer-readable medium on which code is stored in computer readable form, which when executed by a computer system causes the computer system to:
control generating an electronic cutsheet associated with a video package, the electronic cutsheet including information identifying a chronological order of at least two footage items included in the video package, information identifying a rights holder associated with the at least two footage items, and information identifying details on a recorded event that is associated with the at least two footage items, wherein the event comprises a planned structured activity;
control generating a plurality of playlists stored in the newsroom control system, wherein the playlists are based on the generated electronic cutsheet, and further wherein each playlist is associated with at least one video package by creating a pointer to the electronic cutsheet associated with the at least one video package;
control determining an association of each playlist with an aired show, wherein the determining the association of each playlist with an aired show includes checking for footage errors in each cutsheet associated with the aired show, wherein checking for footage errors includes determining whether a sum of runtimes of all footage items associated with a cutsheet equals a total runtime of the cutsheet;
control determining a number of instances in which a footage item was included in an aired show based on references made by an associated playlist to the electronic cutsheet via the pointer; and
control generating a data file indicating at least one rights holder of the footage item and the number of reported instances in which a footage item associated with the indicated rights holder was included in the aired show.

* * * * *